Jan. 18, 1966  H. A. STORCH  3,229,999
THREADED CONNECTING MEMBER
Filed Aug. 15, 1962
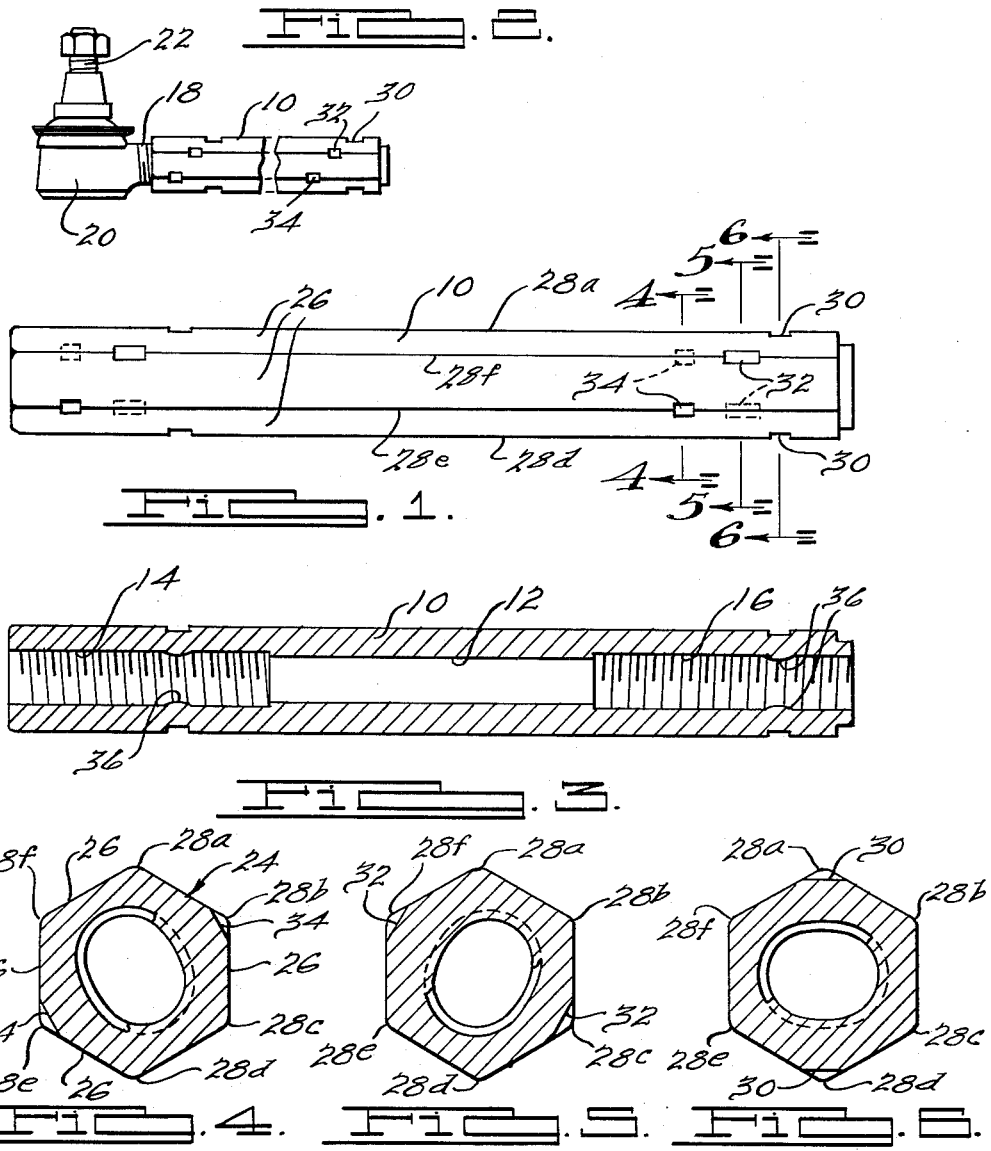
INVENTOR.
Harold A. Storch.
BY
Harness, Dickey & Pierce,
ATTORNEYS.

United States Patent Office 3,229,999
Patented Jan. 18, 1966

3,229,999
THREADED CONNECTING MEMBER
Harold A. Storch, Birmingham, Mich., assignor to Federal Screw Works, Detroit, Mich., a corporation of Michigan
Filed Aug. 15, 1962, Ser. No. 217,085
2 Claims. (Cl. 287—60)

This invention relates to connecting members adapted for connection to a threaded stud or the like and particularly to an internally threaded connecting member having deformed thread areas operable to bind against the male threads of a threaded part to which it is connected for effecting locking engagement therewith.

The present invention may be embodied in a variety of elongated structural members having an internally threaded rodlike portion. However, the present invention finds particular use and suitability in the steering linkages of automotive vehicles. A member embodying the features of the present invention might be used as a tie rod, a turnbuckle or an adjusting sleeve between the tie rod and a ball joint. In steering linkages heretofore utilized, it has been necessary to provide separate clamps by means of which the tie rod is securely held to the shank of a ball joint housing that is threaded into one end of the tie rod. In other applications, tie rod adjusting sleeves have been utilized which provide a linear adjustment between tie rods and ball joint housings or between two tie rod portions. These also have required separate clamps to prevent rotation between the inter-threaded parts. The structure of the present invention contemplates the elimination of such clamps and the direct threading of a threaded shank, rod or other male threaded member into the connecting member of the present invention, with the members being held against relative rotation by a self-locking action produced by the connecting member, itself.

It is accordingly an object of the present invention to provide a connecting member or the like which may be threadably connected to a threaded shank and held in fixed relationship therewith without the use of separate clamps or other fastening means.

It is another object of the present invention to provide a connecting member of the above character in which the male threaded shank inserted into the connecting member is held against pivotal movement or angular "wobbling."

It is a further object of the present invention to provide a connecting member of the above character which may be made to frictionally grip its associated male threaded member with a predetermined force and wherein a substantial percentage of said gripping force will be retained throughout repeated threading and unthreading of the male threaded member into and out of the connecting member.

It is still another object of the present invention to provide a connecting member of the above character which is rugged in construction, inexpensively manufactured, possesses a long, useful life and is conveniently installed on and disassembled from its associated structure.

These and other objects of the present invention will become apparent from the following detailed description taken in conjunction with the accompanying drawings wherein:

FIGURE 1 is an elevational view of a connecting member embodying the features of the present invention;

FIG. 2 is a reduced scale view of the connecting member of FIG. 1 shown in association with a ball joint;

FIG. 3 is a longitudinal sectional view of the structure of FIG. 1; and

FIGS. 4, 5 and 6 are enlarged cross-sectional views of the structure of FIG. 1, taken along the lines 4—4, 5—5 and 6—6, respectively.

Referring now to the drawings, FIGURE 1 illustrates a connecting member 10, which will be seen to possess an elongated rodlike shape. The connecting member 10 has an internal bore 12 extending completely through the length thereof and provided with threads 14 and 16 at its opposite ends. It is to be understood that the member 10 may be solid at its midportion and have separate threaded bores at each end.

FIG. 2 illustrates one usage of the member 10 as receiving at its one end the threaded shank 18 of a ball joint housing 20, which supports a stud 22 for universal movement. The stud 22 is adapted to be connected to a steering arm (not shown) or other steering linkage part.

It will be seen that the connecting member 10 comprises a unitary body formed from steel or other metal and the formation of the bore 12 therein provides the connecting member 10 with an annular cross-sectional shape possessing a regular polygonal outer periphery 24. The outer periphery 24 includes a plurality of flat walls 26, which are contiguous along a plurality of longitudinally extending edges 28a, 28b, 28c, 28d, 28e and 28f. Both of the threads 14 and 16 are adapted to be provided with displaced areas or portions formed by the radially inward distortion or indentation of selected areas or portions of the member 10 at its outer periphery 24. The arrangement and location of the indentations at each end of the connecting member 10 are identical and, accordingly, a description of that portion of the member 10 adjacent the thread 16 will serve to illustrate the invention.

It will be seen that the outer periphery 24 is indented in diametrically opposite pairs of locations spaced axially along the connecting member 10 within the limits of the thread 16. A first opposite pair of indentations is shown at 30; a second pair of indentations is shown at 32; and a third pair of indentations is illustrated at 34. The indentations of each of the pairs 30, 32 and 34 are angularly spaced so as to be diametrically opposite one another and each of the three pairs is angularly offset or rotated with respect to the other pairs. The indentations 30, 32 and 34 are made by striking the outer periphery 24 of the connecting member 10 at diametrically opposite pairs of edges 28a, etc., with a flat indenter die or the like (not shown) to radially inwardly indent the material of the member 10 in separate, small, well-defined areas. It will be seen that the indentations 30 are located at edges 28a and 23d, respectively, the indentations 32 are located at the edges 28f and 28c, respectively, and the indentations 34 are located at the edges 28e and 28b, respectively. The formation of the indentations 30, 32 and 34 radially inwardly displaces the portions of the thread 16 adjacent thereto to form inwardly offset or displaced thread areas 36. The location of the indentations 30, 32 and 34 at the edges 28a, 28b, 28c, 28d, 28e and 28f has been found to result in better defined, more localized displaced thread areas 36. It will be seen that the edges 28a, 28b, 28c, 28d, 28e and 28f provide the areas of greatest radial thickness of the material of the connecting member 10 and, by inwardly distorting the material in such areas of greatest thickness, there is a lesser tendency on the part of the metal to "spring back" toward its original shape afterwards. Additionally, a more accurate depth of indentation may be obtained and the given indentation will produce a more predictable gripping force, with a greater percentage of the initial gripping force being maintained over a long period of usage as compared to a construction in which the indentations are disposed on the flats or "side walls" of the material. It will be seen that the angular and longitudinal spacing of the indentations 30, 32 and 34 provides displaced thread areas 36 which will grip a stud or other male threaded member in a manner preventing wobbling or cocking of the stud relative to the member 10.

In the preferred embodiment of the invention illustrated herein, the axially middle pair of indentations 32 are of greater size than the other pairs of indentations 30 and 34. As a result, the indentations 32 contribute the bulk of the gripping force or torque (referring to the force required to rotate the member 10 with respect to the male threaded member received therein). This is advantageous in that it renders the regulation of the torque much easier. In such a construction, the indentations 30 and 34 serve primarily to stabilize the male threaded member and prevent the previously mentioned cocking or wobbling of the male threaded member, which would result if only the indentations 32 were provided and the indentations 30 and 34 were omitted. The male threaded member is thus gripped on all sides by six displaced thread areas 36, which are angularly spaced sixty degrees apart and which are arranged in three axially spaced positions within the length of the thread 16. The member 10 is thereby securely united to its male threaded member and any looseness in the resulting joint is avoided.

It is to be noted that the flat walls 26 of the member 10 provide shoulders or surfaces engageable by a standard open end wrench for the convenient rotation of the member 10 with respect to the male threaded member with which it is used. While the member 10 is adapted to be indented in the area of the thread 14 in a manner similar to the indentation adjacent the thread 16, it will be appreciated that the invention is equally applicable to a connecting member having a threaded bore at just one end thereof.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A connecting member for tie rods or the like, comprising a body having a pair of opposite end surfaces and a bore extending between said end surfaces provided with threads of opposite hand at the opposite ends thereof, said body having an outer periphery surrounding each of said threads provided with six contiguous outer flat side walls of equal width converging along six edges extending parallel to the thread axis and a plurality of pairs of axially and angularly spaced indentations at each end of said body, the indentations of each pair being diametrically opposed, each of said indentations being centered with respect to a radial plane including one of said edges, spaced from both of said end surfaces, defined on its radially inner side by a thread area which is displaced radially inwardly of the normal thread diameter and defined on its outer side by a localized indentation surface, said localized indentation surface extending between an adjacent pair of said side walls having a width less than the width of said side walls and extending radially inwardly of a line including its adjacent edge.

2. The structure set forth in claim 1 in which there are at each end of said body three pairs of indentations, the indentations of each pair being disposed diametrically opposite one another and each pair of indentations being displaced axially from the other pairs of indentations.

References Cited by the Examiner

UNITED STATES PATENTS

| | | | |
|---|---|---|---|
| 1,478,124 | 12/1923 | Johnson | 287—60 |
| 1,973,322 | 9/1934 | Staples | 287—60 |
| 3,065,983 | 11/1962 | Flumerfelt. | |
| 3,171,459 | 3/1965 | Storch. | |

FOREIGN PATENTS

| | | |
|---|---|---|
| 969,618 | 5/1950 | France. |
| 1,228,099 | 3/1960 | France. |
| 10,396 | 8/1886 | Great Britain. |
| 544,316 | 4/1942 | Great Britain. |

EDWARD C. ALLEN, *Primary Examiner.*